Nov. 30, 1965  L. R. WILLIAMS  3,220,680
HOSE SUPPORT
Filed Feb. 10, 1964  2 Sheets-Sheet 1
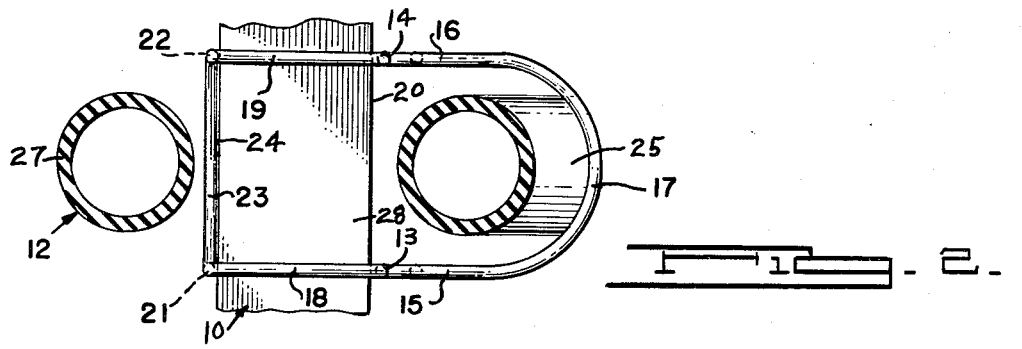
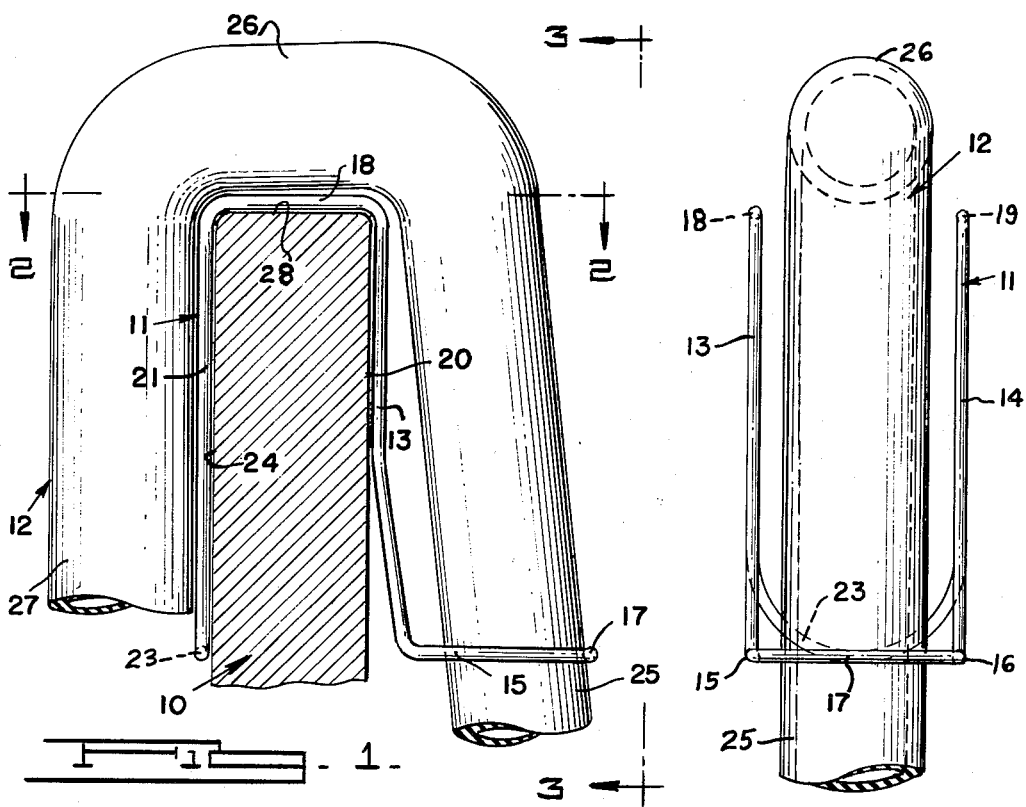
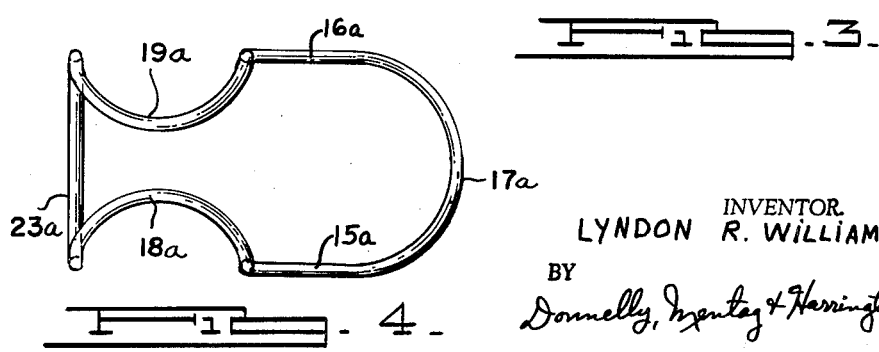
INVENTOR.
LYNDON R. WILLIAMS
BY
Donnelly, Mentag & Harrington
ATTORNEYS

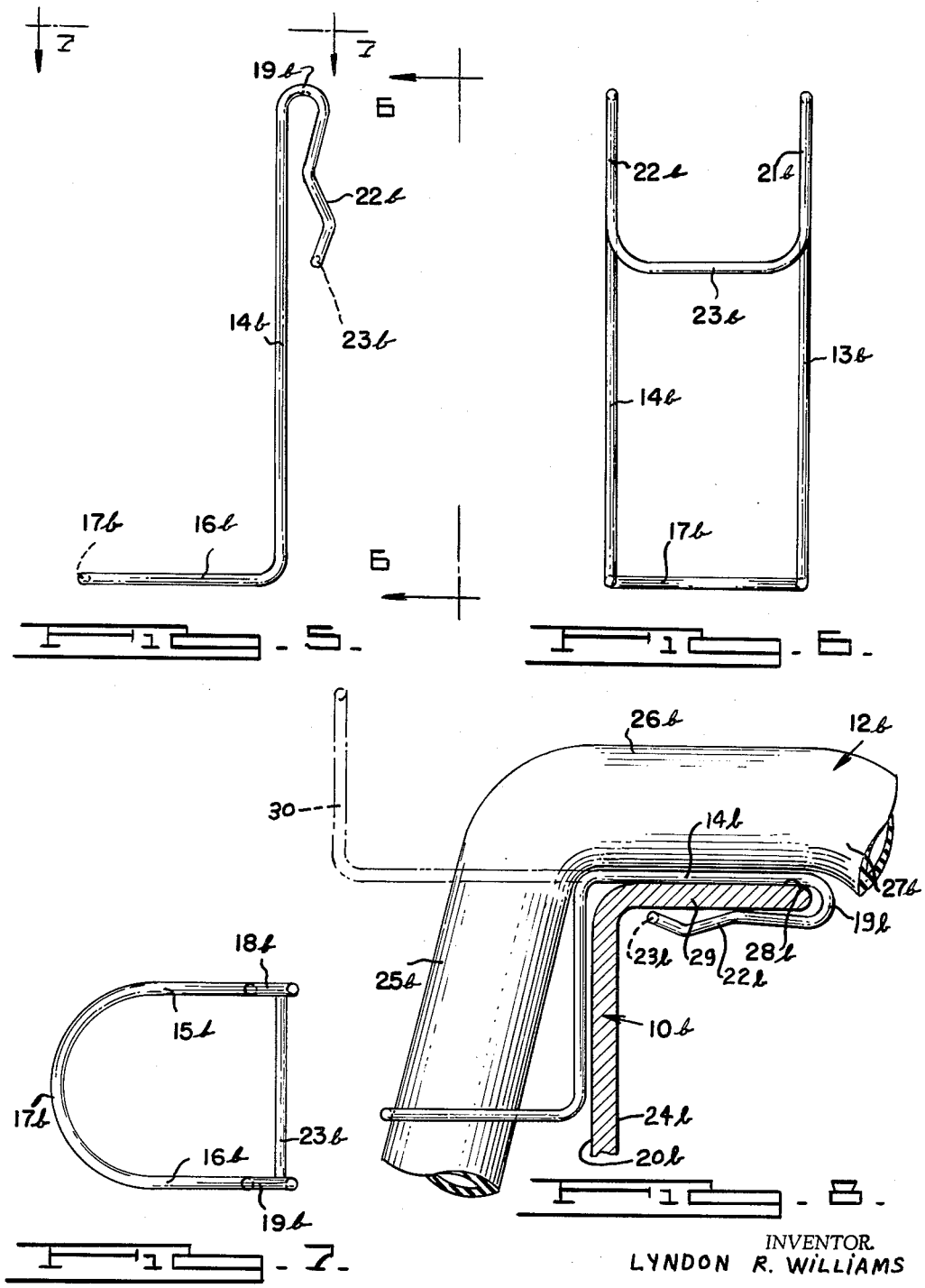

United States Patent Office 3,220,680
Patented Nov. 30, 1965

3,220,680
HOSE SUPPORT
Lyndon R. Williams, 806 Magnolia, Royal Oak, Mich.
Filed Feb. 10, 1964, Ser. No. 343,811
1 Claim. (Cl. 248—79)

This invention relates generally to the hose support art, and more particularly to a novel and improved support for detachably locking the free end of a hose within a container such as a washtub or the like.

The present type automatic washing machines are provided with means for automatically pumping the suds into a reserve container such as a washtub during a subsequent wash cycle, to hold the same for further use with a succeeding wash load. The suds are conveyed to the reservoir tub by use of a suitable hose which normally is provided with a curved portion adjacent the free end thereof to maintain the same over the side of the tub. Experience has shown that due to the heat from the hot suds and the pressure of the suds being pumped through the hose, the hose has a tendency to straighten out and splash the suds over the tub sides. A further disadvantage of this suds return hose is that it tends to slip off the tub wall. Also, the suds hose does not remain in a vertical position for efficient return pumping of the suds for the next wash cycle. Accordingly, it is the primary object of the present invention to provide a novel and improved hose support for retaining the free end of the washing machine suds return hose in a locked, substantially vertical position, in a washtub or the like to provide efficient use of the return suds system of the washing machine.

It is another object of the present invention to provide a novel and improved hose support which is simple and compact in construction, economical of manufacture, efficient in operation and which can be detachably secured to the free end of a hose and to the rim of a container in a fast and easy manner.

It is a further object of the present invention to provide a novel and improved detachable hose support which is adapted to securely lock and hold the free end of a hose to a container without the use of any tools or the use of screws, bolts, springs or other independent means that require the use of tools to install the same, and which support cannot be accidentally detached from the container.

It is still another object of the present invention to provide a novel and improved hose support which includes a clamp portion and a hose engaging or retainer portion. The clamp portion of the support is adapted to be detachably mounted on the rim of a container in a stationary manner so as to prevent any rotation of the clamp portion about the rim of the container, and to securely lock the hose retainer portion in engagement with the free end of a washing machine hose or the like.

Other objects, features and advantages of this invention will be apparent from the following detailed description, appended claims, and the accompanying drawings.

In the drawings:

FIG. 1 is a side elevational view of a hose support made in accordance with the principles of the present invention and showing the hose support mounted on the upper end of a washtub wall and supporting the free end of a suds return hose in a substantially vertical position in the tub;

FIG. 2 is a top plan view of the hose support, taken along the line 2—2 of FIG. 1, and showing the hose in cross section;

FIG. 3 is a front end elevational view of the hose support structure illustrated in FIG. 1, taken along the line 3—3 thereof and showing the washtub wall removed;

FIG. 4 is a top plan view of a second embodiment of a hose support made in accordance with the principles of the present invention;

FIG. 5 is a side elevational view of a third embodiment of a hose support made in accordance with the principles of the present invention;

FIG. 6 is a rear elevational view of the hose support illustrated in FIG. 5, taken along the line 6—6 thereof and looking in the direction of the arrows;

FIG. 7 is a top plan view of the hose support structure illustrated in FIG. 5, taken along the line 7—7 thereof and looking in the direction of the arrows; and, FIG. 8 is a side elevational view of the hose support illustrated in FIGS. 5, 6 and 7 and showing the hose support mounted in an operative position on a fragmentary portion of a washtub wall.

Referring now to the drawings and in particular to FIGS. 1, 2 and 3, wherein is shown a first embodiment of the invention, the numeral 10 generally indicates a fragmentary portion of the upper end of a washtub wall of the type into which the return suds from a washing machine is transferred to and from the washing machine during a complete washing cycle. The hose support of the present invention is generally indicated by the numeral 11 and the washing machine suds transfer hose is generally indicated by the numeral 12. The hose support 11 of the present invention comprises a clamp portion and a hose retainer portion, as more fully described hereinafter.

As shown in FIGS. 1, 2 and 3, the hose support clamp portion includes a pair of spaced apart, inner, vertically disposed, elongated legs 13 and 14 which are adapted to be disposed along the inner surface of the washtub wall 10. As best seen in FIG. 1, the lower ends of the clamping portion inner legs 13 and 14 are bent slightly outwardly so as to slope downwardly and outwardly from the inner surface of the washtub wall 10. The lower ends of the sloping clamping portion leg 13 and 14 are integral with the horizontal, parallel, spaced apart arms 15 and 16, respectively, of the hose retainer portion of the hose support. As best seen in FIGS. 1 and 2, the arms of the hose retainer portion extend inwardly of the washtub and are integrally connected at the outer ends thereof with the U-shaped hose retainer portion 17. The portion 17 may be termed a bight portion, and is substantially half round in configuration.

The clamp portion of the hose support further includes the pair of spaced-apart, substantially horizontal connector members 18 and 19 which are integrally connected to the upper ends of the clamp portion legs 13 and 14, respectively. The connector members 18 and 19 may be curved or otherwise shaped in accordance with the configuration of the upper end of a washtub or the like. The connector members 18 and 19 extend outwardly of the washtub wall 10 and are integrally connected at the outer ends thereof with the upper ends of the vertical, laterally spaced apart, elongated outer legs 21 and 22, respectively.

As best seen in FIGS. 1 and 2, the clamp portion outer legs 21 and 22 extend downwardly along the outer surface 24 of the washtub wall 10 to a point substantially opposite the hose retainer portion arms 15 and 16. The lower ends of the outer clamp legs 21 and 22 are integrally connected by the U-shaped bight portion 23. It will be seen that the inner clamp portion legs 13 and 14 rest against the inner surface 20 of the washtub wall 10 and the connector members 18 and 19 are adapted to rest on the upper end surface 28 of the washtub wall 10.

The hose support of the present invention may be made from any suitable steel wire as, for example, from steel wire of a diameter of .091 inch. The hose support is made from a piece of steel wire which is bent in accordance with the configuration of the hose support shown in FIGS. 1, 2 and 3, and with the ends of the wire fixedly connected together, as by welding. The hose support may be covered with a suitable plastic material which may be applied by any suitable process as, for example, a dip process. In one embodiment the plastic material was put on to a thickness of .031 inch. It will be understood that the hose support may also be made without the plastic coating and may be made without any coating or it may be zinc plated. In one zinc plated embodiment the diameter of the steel wire used was .120 inch.

It will be understood that the hose support of the present invention may be made to any desired size, and that the inner and outer legs of the clamp portion are formed so as to slope toward each other when in the free state so as to provide a clamping action on the washtub wall 10 when the hose support is mounted thereon. The inner and outer legs of the clamping portion thus yieldingly embrace the washtub wall in a detachable, clamping manner.

In the use of the hose support as illustrated in FIGS. 1, 2 and 3, the hose support may be mounted on the washtub wall 10 before the hose 12 is mounted on the support, or the support may be mounted on the hose before it is mounted on the washtub wall 10. A washing machine transfer hose 12 has been illustrated in FIGS. 1, 2 and 3 as comprising the three portions 25, 26 and 27. The portion 27 would be the portion which is connected to the washing machine. The hose portion 25 is the free end which is extended down into the washtub. The upper ends of the hose portions 25 and 27 are integrally connected by the bight portion 26 which is shown as substantially inverted U-shaped in cross section. Normally the upper ends of the hose portions 25 and 26 are connected by such a connector portion 26 which may be semi-circular in shape or as shown in FIG. 1. As shown in FIG. 1, the the hose connector portion 26 is disposed immediately above the clamp portion connector members 18 and 19, but it will be understood that in use the hose connector portion 26 may be moved downwardly into seating engagement on the upper surface 28 of the washtub wall 10. The free end portion 25 of the hose 12 extends downwardly into the washtub and passes through the hose retainer portion formed by the members 15, 16 and 17. The hose portion 25 is shown as having a slightly downward and outward sloping position, but it will be understood that the hose portion 25 may be moved inwardly to a more vertical position in accordance with the lengths of the retainer arms 15 and 16, the outwardly sloping angle of the lower ends of the legs 13 and 14, the size of the hose and other variable factors. It will be seen that the hose retainer portion functions to retain the free end 25 of the hose in the position shown in FIGS. 1, 2 and 3 so as to restrain it from any straightening out action caused by the pressure of the suds passing through the hose or by the heat of the suds. Without the restraining action of the hose retainer portion the free end 25 of the hose would tend to move counterclockwise, as viewed in FIG. 1, to a horizontal position whereby the machine cannot pump the suds back through the hose for a later or subsequent cycle. Because of the novel structure of the hose support the clamp portion will not pivot on the washtub wall 10 regardless of the pressure or other action of the suds being pumped through the hose 12. Experience has shown that the hose support of the present invention is an efficient and practical device.

FIG. 4 illustrates a second embodiment of the invention. The hose support illustrated in FIG. 4 is constructed in the same manner as the hose support of FIGS. 1, 2 and 3 and the corresponding parts have been marked with the same reference numerals followed by the small letter *a*. The only difference in the structure of the second embodiment of FIG. 4 is that the connector members 18*a* and 19*a* have been provided with an inwardly extended, arcuate construction to provide additional clamping action between these connector members. It will be understood that the embodiment of FIG. 4 is used in the same manner as the embodiment of FIGS. 1, 2 and 3 with the exception that the connector portion 26 of the hose 12 would rest on the upper sides of the connector members 18*a* and 19*a* instead of on the upper surface 28 of the washtub wall 10.

FIGS. 5, 6, 7 and 8 illustrate a third embodiment of the invention which is especially adapted for use on a washtub or the like which is provided with a horizontal flange or rim along the upper end of the side wall. In FIG. 8 the side wall of the washtub or the like has been indicated by the numeral 10*b* and the horizontal flange is indicated by the numeral 29 and is located on the upper end of the wall 10*b*. The upper surface of the flange 29 has been indicated by the numeral 28*b*, the inner and outer surfaces of the washtub wall 10*b* have been indicated by the numerals 20*b* and 24*b*.

The hose support shown in FIGS. 5 through 8 is formed in substantially the same manner as the embodiment of FIGS. 1, 2 and 3 and the corresponding parts have been marked with similar reference numerals followed by the small letter *b*. In the use of the embodiment of FIGS. 5 to 8 the inner clamping legs 13*b* and 14*b* are first disposed on the upper surface 28*b* of the wall flange 29 as illustrated in FIG. 8, and with the lower ends thereof and the hose retainer portion extending outwardly as indicated by the dotted line portion 30. The outer clamping legs 21 and 22 are formed with a slightly inwardly bent portion which is directed toward the inner legs 13*b* and 14*b*. As shown in FIG. 8, the outer clamping legs 21*b* and 22*b* are adapted to frictionally engage the lower surface of the flange 29 to coact with the inner clamping legs 13*b* and 14*b* for clamping the hose support in place on the flange 29. After the clamping legs have been moved into clamping engagement with the flange 29 the inner ends of the clamp legs 13*b* and 14*b* are bent downwardly against the inner surface 20*b* of the washtub wall 10*b*, and the hose support is then in an operative position and ready to receive the free end 25*b* of the hose 12*b*. The hose support of FIGS. 5 through 8 may be quickly detached from the washtub wall 10*b* by merely reversing the aforedescribed mounting procedure. The hose 12*b* is shown in FIG. 8 disposed slightly above the hose support leg 14*b*, but it will be understood that in operation it will be moved downwardly to have the hose portion 26*b* resting on the wall flange surface 28*b* and in a position between the legs 13*b* and 14*b*.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claim.

What I claim is:

A hose clamp for use over the edge of a vertical support adapted to have an intermediate portion of hose draped thereover, comprising a one-piece U-shaped endless wire including a first pair of mutually parallel, elongated legs for flush engagement on one side of a vertical support, said legs including a lower, outwardly angled portion terminating at lower ends in mutually parallel arms extending outwardly from the general plane of said first pair of legs and connected to a transverse bight portion spaced from the general plane of said first pair of legs for embracing the outer surface of a hose with the arm flanking the hose, said first pair of legs terminating at upper portions in connector members extending away from the general plane of said first pair of legs in a direction opposite that which said arms extend for engaging over the upper edge of a support and beneath the hose, said connector members continuing in a second pair of mutually parallel legs depending from said connector members in the direction toward which said first pair of legs extend for engaging said vertical support at the side opposite that which said first pair of legs engage, said second pair of legs being connected by a second transverse bight portion, connector members including intermediate portions converging toward each other for providing a biasing pressure to said arms when they flank the hose.

References Cited by the Examiner

UNITED STATES PATENTS

| | | | |
|---|---|---|---|
| 659,669 | 10/1900 | Haynes | 248—79 X |
| 1,493,498 | 5/1924 | Pluym | 248—79 |
| 1,793,520 | 2/1931 | Siptrott | 24—66 X |
| 2,098,374 | 11/1937 | Bullock | 248—94 |
| 2,636,704 | 4/1953 | Norberg | 248—79 |
| 2,659,491 | 11/1953 | Williams | 248—214 |
| 2,930,156 | 3/1960 | Jones | 40—11 |

FOREIGN PATENTS

| | | |
|---|---|---|
| 855,081 | 11/1960 | Great Britain. |
| 328,374 | 3/1958 | Switzerland. |

CLAUDE A. LE ROY, *Primary Examiner.*